(12) United States Patent
Ohshima et al.

(10) Patent No.: US 10,004,041 B2
(45) Date of Patent: Jun. 19, 2018

(54) COMMUNICATION APPARATUS PERFORMING COMMUNICATION OPERATION BASED ON A DETECTED TEMPERATURE, CONTROL METHOD THEREOF AND STORAGE MEDIUM

(71) Applicant: CANON KABUSHIKI KAISHA, Tokyo (JP)

(72) Inventors: Hideaki Ohshima, Kawasaki (JP); Takashi Matsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 15/245,646

(22) Filed: Aug. 24, 2016

(65) Prior Publication Data

US 2017/0064632 A1 Mar. 2, 2017

(30) Foreign Application Priority Data

Aug. 27, 2015 (JP) ................. 2015-168140

(51) Int. Cl.
*H04W 52/02* (2009.01)
*H04N 1/00* (2006.01)
*H04W 24/08* (2009.01)

(52) U.S. Cl.
CPC ...... *H04W 52/0251* (2013.01); *H04N 1/0001* (2013.01); *H04N 1/00042* (2013.01); *H04N 1/00082* (2013.01); *H04N 1/00214* (2013.01); *H04N 1/00925* (2013.01); *H04W 24/08* (2013.01); *H04N 2201/0084* (2013.01); *Y02B 60/50* (2013.01); *Y02D 70/00* (2018.01)

(58) Field of Classification Search
CPC ............. H04W 52/0251; H04W 24/08; H04N 1/00082; H04N 1/00042; H04N 1/00925; H04N 1/00214; H04N 1/0001; H04N 2201/0084; Y02B 60/50
See application file for complete search history.

(56) References Cited

U.S. PATENT DOCUMENTS

2017/0041881 A1* 2/2017 Won ...................... H04W 52/18

FOREIGN PATENT DOCUMENTS

JP 2003-309473 A 10/2003
JP 2006-245862 A 9/2006

* cited by examiner

*Primary Examiner* — Nam Huynh
(74) *Attorney, Agent, or Firm* — Cowan, Liebowitz & Latman, P.C.

(57) ABSTRACT

A communication apparatus comprises: a communication unit configured to communicate data with an external apparatus; a detection unit configured to detect a temperature of the communication apparatus; and a control unit configured to cause the detection unit to detect a temperature of the communication apparatus, perform, in a case where the detected temperature is lower than a predetermined temperature, a first communication operation performed without suspending the data transfer, and perform, in a case where the detected temperature is higher than or equal to the predetermined temperature, a second communication operation performed while suspending the data transfer, wherein the control unit sets, based on a communication state of the communication unit, a suspension time of the data transfer when performing the second communication operation.

13 Claims, 9 Drawing Sheets

| LINK SPEED | RADIO FIELD INTENSITY 1 | | RADIO FIELD INTENSITY 2 | | RADIO FIELD INTENSITY 3 | |
|---|---|---|---|---|---|---|
| | TRANSFER SIZE | TRANSFER RATIO | TRANSFER SIZE | TRANSFER RATIO | TRANSFER SIZE | TRANSFER RATIO |
| 1Mbps | 1KByte | 30% | 2KByte | 40% | 4KByte | 50% |
| 2Mbps | 2KByte | 30% | 4KByte | 40% | 8KByte | 50% |
| ～ | | | | | | |
| 390Mbps | 256KByte | 30% | 512KByte | 40% | 1MByte | 50% |
| 433Mbps | 256KByte | 30% | 512KByte | 40% | 1MByte | 50% |

|  | TEMPERATURE DIFFERENCE FROM TEMPERATURE DETECTION UNIT 212 | TEMPERATURE AT WHICH WIRELESS COMMUNICATION IS TO BE STOPPED |
|---|---|---|
| EXTERNAL WIRELESS LAN | 10°C | 50°C |
| LTE | 12°C | 48°C |
| BUILT-IN WIRELESS LAN | 1°C | 59°C |
| Bluetooth | 8°C | 52°C |

COMMUNICATION APPARATUS PERFORMING COMMUNICATION OPERATION BASED ON A DETECTED TEMPERATURE, CONTROL METHOD THEREOF AND STORAGE MEDIUM

BACKGROUND OF THE INVENTION

Field of the Invention

The present invention relates to a communication apparatus, a control method thereof and a storage medium.

Description of the Related Art

In recent years, as the speed of wireless communication increases, electrical power consumed by wireless communication terminals has been increasing. Therefore, there is concern that the temperature of the casing surface of a wireless communication terminal may become high due to generation of a large amount of heat during wireless communication, and that a malfunction may occur due to the influence of the high temperature, and thus there is a demand for suppressing the heat generation.

As a technique for suppressing heat generation in a wireless communication terminal, Japanese Patent Laid-Open No. 2003-309473 suggests a technique for performing control so as to periodically attenuate transmission output during transmission and to stop transmission output in the case where a certain temperature monitored, using a temperature sensor is exceeded.

Moreover, Japanese Patent Laid-Open No. 2006-245862 suggests a technique for suppressing heat generation by switching, in accordance with a detected temperature, between a normal mode in which it is possible to multiplex the number of transmission slots and to switch the method for modulating transmission signals and a transmission control mode in which transmission is performed using a fixed modulation method that is not switched.

However, in the technique suggested in Japanese Patent Laid-Open No. 2003-309473, transmission output is attenuated in order to limit the electrical power consumed during transmission, but the reaching distance is shortened if the transmission output is attenuated, and there are cases where wireless communication itself is disconnected. Moreover, in the technique suggested in Japanese Patent Laid-Open No. 2006-245862, the transmission data rate is reduced when a switch is made to the transmission control mode, whereby the electrical power consumption increases with a reduced transmission speed when transferring the same amount of data.

SUMMARY OF THE INVENTION

The present invention has been made in consideration of the aforementioned problems, and realizes a technique for making it possible to achieve both the temperature control and the transfer efficiency of a communication terminal during wireless communication.

In order to solve the aforementioned problems, one aspect of the present invention provides a communication apparatus comprising: a communication unit configured to communicate data with an external apparatus; a detection unit configured to detect a temperature of the communication apparatus; and a control unit configured to, when performing data transfer to the external apparatus via the communication unit, cause the detection unit to detect a temperature of the communication apparatus, perform, in a case where the detected temperature is lower than a predetermined temperature, a first communication operation performed without suspending the data transfer, and perform, in a case where the detected temperature is higher than or equal to the predetermined temperature, a second communication operation performed while suspending the data transfer, wherein the control unit sets, based on a communication state of the communication unit, a suspension time of the data transfer when performing the second communication operation.

Another aspect of the present invention provides, a control method of a communication apparatus having a communication unit configured such that the communication apparatus communicates data with an external apparatus and a detection unit configured to detect a temperature of the communication apparatus, the method comprising: performing control so as to cause, when performing data transfer to the external apparatus via the communication unit, the detection unit to detect a temperature of the communication apparatus, perform, in a case where the detected temperature is lower than a predetermined temperature, a first communication operation performed without suspending the data transfer, and perform, in a case where the detected temperature is higher than or equal to the predetermined temperature, a second communication operation performed while suspending the data transfer, wherein in the controlling, a suspension time of the data transfer when performing the second communication operation is set based on a communication state of the communication unit.

Still another aspect of the present invention provides, a non-transitory computer-readable storage medium storing a program for causing a computer to function as each unit of a communication apparatus comprising: a communication unit configured to communicate data with an external apparatus; a detection unit configured to detect a temperature of the communication apparatus; and a control unit configured to, when performing data transfer to the external apparatus via the communication unit, cause the detection unit to detect a temperature of the communication apparatus, perform, in a case where the detected temperature is lower than a predetermined temperature, a first communication operation performed without suspending the data transfer, and perform, in a case where the detected temperature is higher than or equal to the predetermined temperature, a second communication operation performed while suspending the data transfer, wherein the control unit sets, based on a communication state of the communication unit, a suspension time of the data transfer when performing the second communication operation.

According to the present invention, it becomes possible to achieve both the temperature control and the transfer efficiency of a communication terminal during wireless communication.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

First Embodiment

Exemplary embodiments of the present invention will be described below in detail with reference to the drawings. Note that an example will be described below in which the present invention is applied to an arbitrary digital camera capable of performing wireless communication as an example of a communication apparatus. However, the present invention is not limited to digital cameras, and can also be applied to any electronic devices capable of performing wireless communication. Such electronic devices may include mobile phones, gaming devices, tablet terminals, personal computers, watch-type and eyeglass-type information terminals, on-vehicle devices, medical devices and the like.

Configuration of Digital Camera 200

Figure 2:
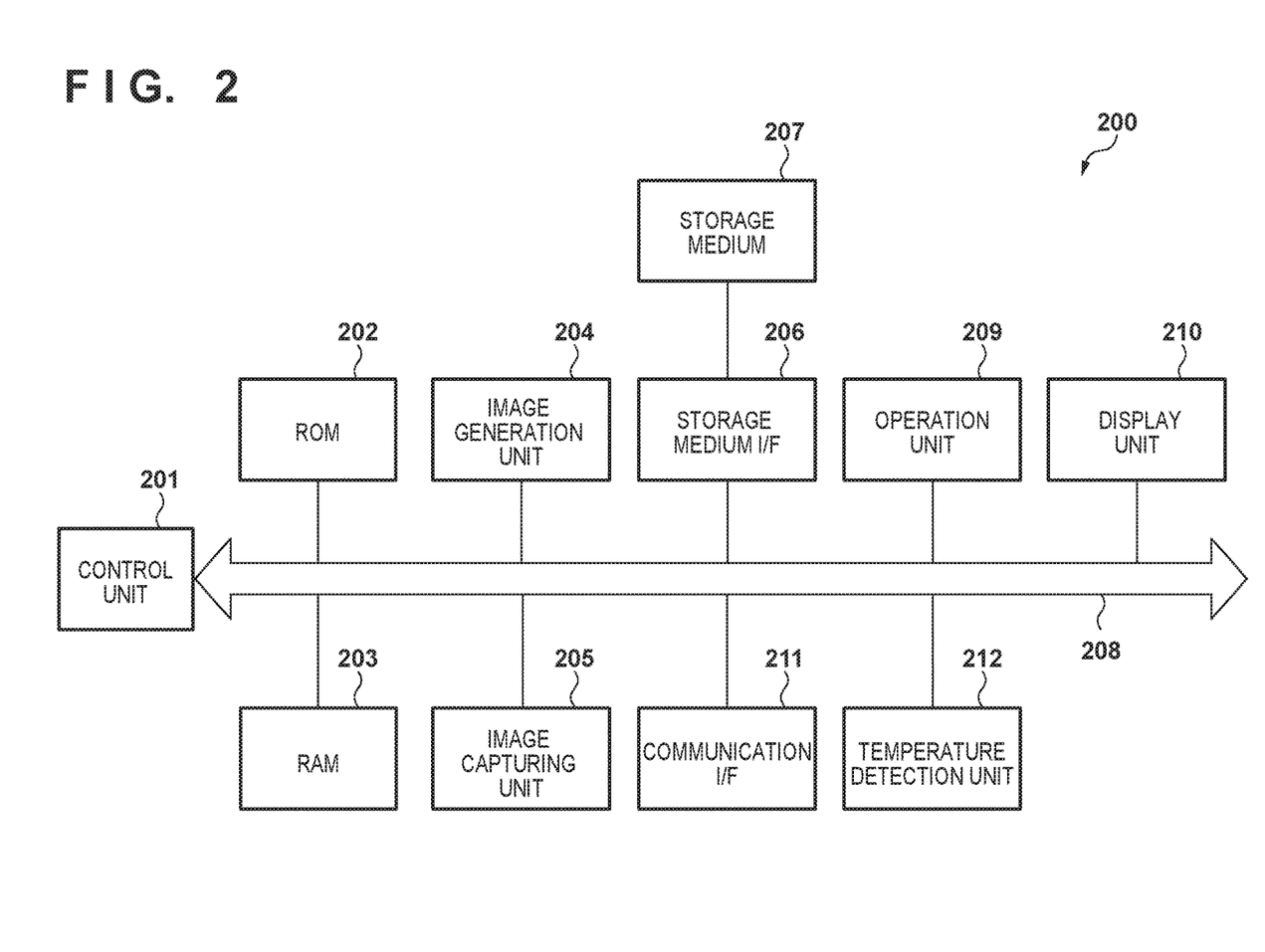
FIG. 2 is a block diagram showing an example of a function configuration of a digital camera as an example of a communication apparatus according to the first embodiment.

FIG. 2 is a block diagram showing an example of the function configuration of a digital camera 200 as an example of the communication apparatus of this embodiment. Note that one or more of the function blocks shown in FIG. 2 may be realized, by hardware such as an ASIC or a programmable logic array (PLA), or may be realized by a programmable processor such as a CPU or an MPU executing software. Such function blocks may also be realized by a combination of software and hardware. Therefore, even in a case where different function blocks are described as performing certain operations in the following description, it is possible that those operations are realized by the same hardware.

A control unit 201 includes a CPU or an MPU, for example, and by loading a program stored in a ROM 202 to a work area of a RAM 203 and executing the program, performs overall control of the digital camera 200. The constituent elements of the communication apparatus that will be described below are connected to a bus 208, and transmit/receive various types of control information and data to/from each other.

The ROM 202 includes a nonvolatile storage medium such as a flash memory, and holds programs that are executed, by the control unit 201, and the like. The RAM 203 includes a volatile storage medium, and is used as a work area when the control unit 201 executes such programs. The RAM 203 is also used as an area in which image data generated by an image generation unit 204 is temporarily buffered before being recorded to a storage medium 207.

An image capturing unit 205 includes an image capturing optical system, an image sensor, an A/D converter and the like. The image sensor has a configuration in which a plurality of pixels each having a CMOS photoelectric conversion element or the like are two-dimensionally arranged, and photoelectrically converts light that is incident from the image capturing optical system and outputs analog signals. The A/D converter converts the analog signals that have been input into digital signals, and stores the digital signals to the RAM 203.

The image generation unit 204 performs image generation processing such as JPEG encoding and MPEG encoding on digital signals output from the image capturing unit 205 and stored in the RAM 203, and generates image data. Also when performing predetermined image processing and edit processing on image data read out from the storage medium 207, the image generation unit 204 performs image generation processing so as to generate new image data.

A storage medium I/F (interface) 206 includes a control circuit or a control module, and controls reading/writing of data from/to the storage medium 207. The storage medium 207 includes a storage medium such as a memory card or a hard disk, and records image data generated by the image generation unit 204.

An operation unit 209 includes various buttons such as a shutter button, a cross key, a determination button, a menu button and a power button, or a touch panel, and detects user operation instructions and notifies the control unit 201. The operation unit 209 detects two states of the shutter button, namely a half-pressed state (S1) and a further-pressed state (S2) based on a pressing operation of the button. The operation unit 209 also detects menu operations, image data selection and the like performed using the cross key, and detects determination of a selected item performed using the determination button.

A display unit 210 displays captured image data and image data read out from the storage medium 207. In order to function as the touch panel included in the operation unit 209, the display unit 210 also displays a GUI constituting an operation menu.

A communication I/F (interface) 211 has a function of performing communication by connecting to an external apparatus, and a function of a wired communication unit or a wireless communication unit for realizing communication conforming to a wireless system such as a wireless LAN, for example.

A temperature detection unit 212 includes a temperature sensor, measures the temperature of the communication apparatus, and outputs the detected temperature.

Note that the control unit 201 controls transfer control processing for transferring, to an external apparatus, image data captured by the image capturing unit 205 and generated by the image generation unit 204. At this time, the control unit 201 causes image data designated as a transfer target by the user in the operation unit 209 to be read from the storage medium 207 to the RAM 203, and causes the communication I/F 211 to perform communication operations related to transfer control processing.

Series of Operations Related to Transfer Control Processing

Figure 1:
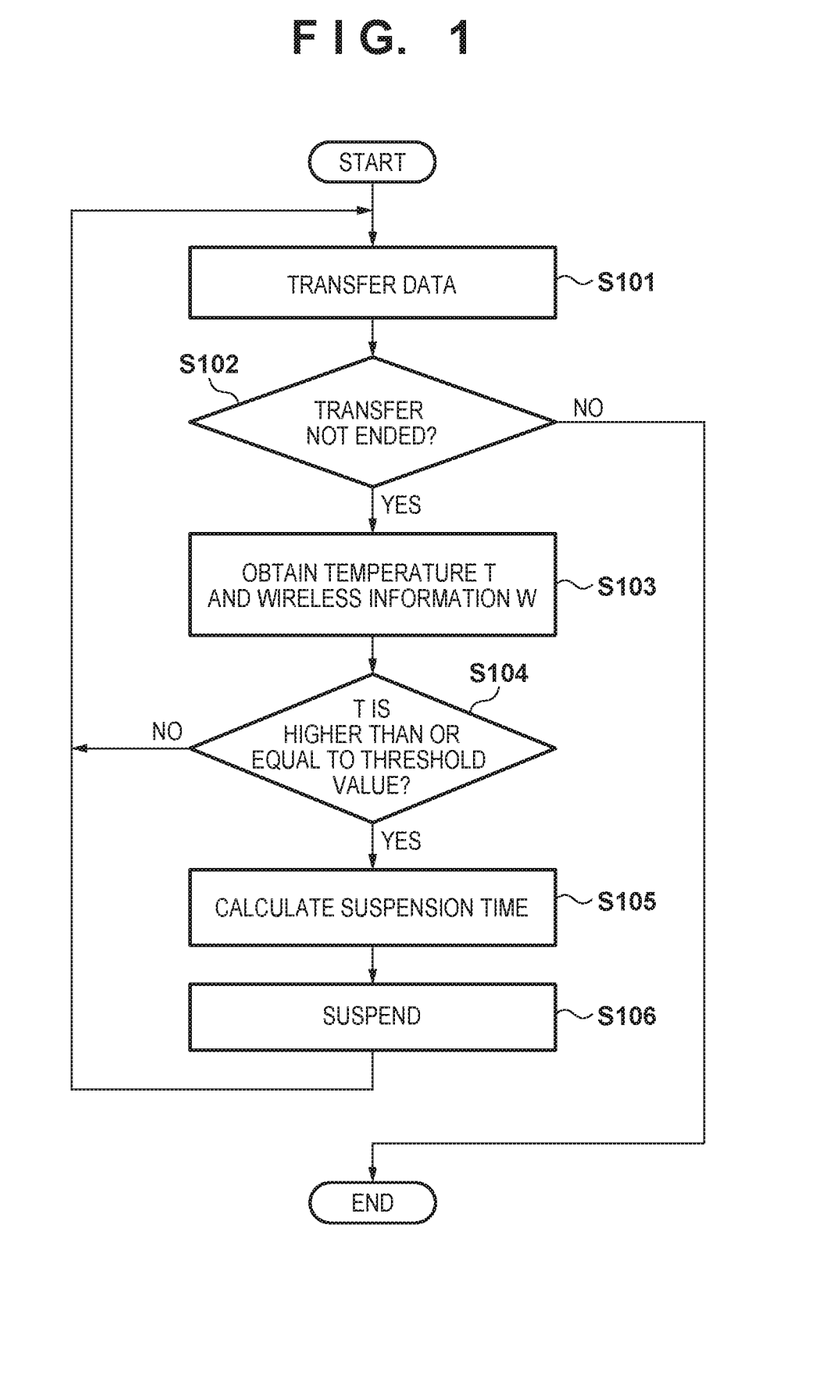
FIG. 1 is a flowchart showing a series of operations of transfer control processing according to a first embodiment of the present invention.

Next, a series of operations related to transfer control processing will be described with reference to FIG. 1. Note that in the case where, for example, a user instruction was given to the operation unit 209 in a state in which in the digital camera 200 displays image data serving as a transfer target on the display unit 210, this processing is started. This processing is realized by the control unit 201 loading a program stored in the ROM 202 to the work area of the RAM 203 and executing the program. The same applies to FIGS. 3, 4 and 8 that will be described later. Note that in this embodiment, data to be transferred is divided in units of packets, and transfer control is performed for each of the divided packets.

In step S101, in the case where a request for transferring image data is given (or suspension processing of step S106 has ended), the control unit 201 transfers the image data. Specifically, the control unit 201 transfers the image data, which is a transfer target, via the communication I/F 211. Note that in the example of this embodiment, data transfer is performed for each packet.

In step S102, the control unit 201 determines whether or not to end the data transfer. Specifically, the control unit 201 determines whether or not all the data has been transferred, and in the case where it is determined that all the data has been transferred, ends this transfer control processing. On the other hand, in the case where it is determined that all the data has not been transferred, the procedure advances to step S103.

In step S103, the control unit 201 obtains a temperature T from the temperature detection unit 212, and obtains wireless information W using the communication I/F 211. The wireless information W indicates a communication state of communication performed by the communication I/F 211, and includes information regarding the link speed and radio field intensity, for example. Upon obtaining the temperature T and the wireless information W, the control unit 201 advances the procedure to step S104. Note that for example, the same obtained value may be used for a predetermined interval, for example, the temperature T is obtained at one second intervals, for example, and the wireless information W is obtained at three second intervals, for example.

In step S104, the control unit 201 compares the temperature T obtained in step S103 to a temperature threshold value, and determines whether or not the temperature T is higher than or equal to the threshold value. In the case where the temperature T is higher than or equal to the temperature threshold value (i.e. the temperature T is higher than or equal to a predetermined, temperature), the control unit 201 advances the procedure to step S105. On the other hand, in the case where the temperature T is lower than the threshold value (i.e. the temperature T is lower than the predetermined temperature), processing is not particularly performed and the procedure returns to step S101 so as to transfer the next packet. Note that the temperature threshold value is a temperature value at which temperature control is to be started, and a temperature determined in advance by conducting experiments or the like can be appropriately set.

In step S105, the control unit 201 calculates a suspension time in accordance with which suspension processing by an intermittent operation is performed. More specifically, the control unit 201 calculates the suspension time from the radio field intensity information included in the wireless information W obtained in step S103 and the time required for transferring image data that is a transfer target in step S101.

Figure 5:
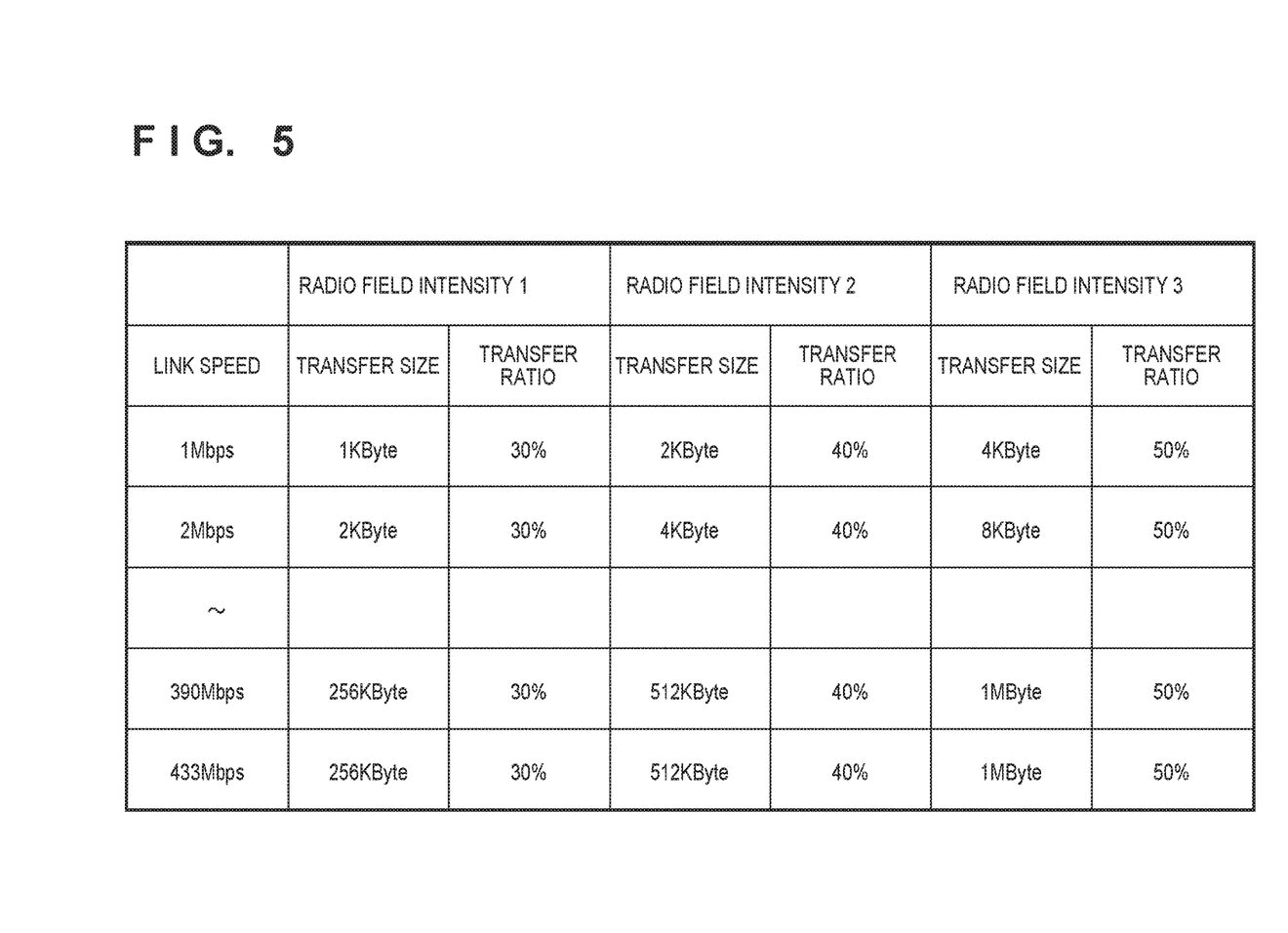
FIG. 5 is a table illustrating examples of transfer control parameters according to the first to fourth embodiments.

An example of calculating the suspension time in this embodiment will be described with reference to FIG. 5. First, based on the radio field intensity of the wireless information W obtained in step S103, a transfer ratio is determined from a reference table shown in FIG. 5. The transfer ratio indicates a ratio of the time for transmitting data to the time required for data transfer. Assume that a higher value of the numeral of the radio field intensities 1 to 3 shown in FIG. 5 indicates stronger radio waves. Generally, the stronger the radio waves are, the better the radio wave environment is, and thus there is a high possibility that the wireless transfer efficiency is improved, the link speed increases and thus the effective rate also increases. In addition, the lower the link speed is, the greater the electrical power consumption required for transferring the same amount of data becomes. Therefore, in this embodiment, the weaker the radio field intensity is, the lower the transfer ratio is set and the longer the suspension time is set. Accordingly, in the case of a low speed, the suspension time is set longer relative to the time required for the transfer. For example, in the case where at the time of the calculation, the link speed is 2 Mbps and the radio field intensity is 1, the transfer ratio is set to 30%. Letting the transfer ratio be u %, the suspension time is calculated with respect to a time t1 required for the transfer by $t1 \times (100-u)/u$. That is, in this example, the suspension time is $7/3 \times t1$.

In step S106, the control unit 201 suspends the data transfer for the suspension time calculated in step S105. When the suspension time has elapsed, the control unit 201 then returns the procedure to step S101, and starts the transfer of the next packet.

As described above, when transferring image data, the data transfer is suspended in accordance with the result of temperature detection by the temperature detection unit 212, and the suspension time for the data transfer is controlled in accordance with the communication state (ex. radio field intensity). With such a configuration, even in the case where the temperature of the digital camera 200 increases to the threshold value or higher, the data transfer can be continued without stopping, and the data transfer can be performed while suppressing a temperature increase by intermittent communication. Moreover, the weaker the radio field intensity is, the longer the suspension time is set, whereby it is possible to realize intermittent communication in which an increase in electrical power consumption required for transferring the same amount of data is suppressed. In other words, it is possible to achieve both the temperature control and the transfer efficiency of the communication terminal during wireless communication.

Second Embodiment

Next, a second embodiment will be described. In the first embodiment, transfer control is performed using a suspension time that is based on a transfer ratio, but in the second embodiment, transfer control is performed using a suspension time that further takes a transfer size into consideration. The digital camera 200 of this embodiment has the same configuration as the first embodiment, and thus the same reference numerals are given to the same constituent elements, redundant description is omitted, and the differences will be mainly described.

Figure 3:
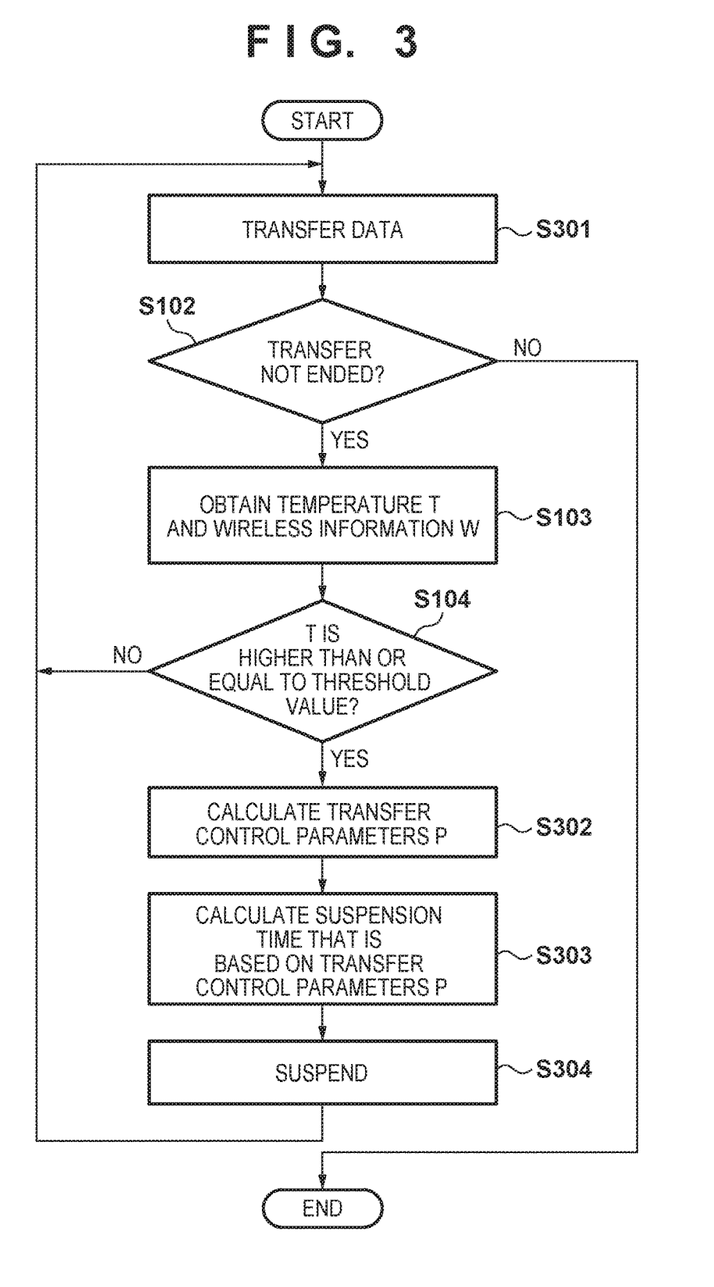
FIG. 3 is a flowchart illustrating a series of operations of transfer control processing according to a second embodiment.

A series of operations of transfer control processing according to this embodiment will be described below with reference to FIG. 3. Note that in this embodiment, an example is illustrated in which the unit of transfer is constituted by a plurality of packets, and transfer control is performed in these units.

In step S301, in the case where a request for transferring image data is given (or suspension processing of step S304 ended), the control unit 201 performs data transfer via the communication I/F 211. In this embodiment, image data is transferred in units of a plurality of packets. Note that the total transfer size constituted by units of a plurality of packets is denoted by L1.

Subsequently, similarly to the first embodiment, the control unit 201 performs the processes of steps S102 to S104, and in the case where all the image data has not been transferred, obtains the temperature T and the wireless information W. After that, in the case where the temperature T is lower than a threshold value, the procedure advances to step S301, and in the case where the temperature T is higher than or equal to the threshold value, the procedure advances to step S302.

In step S302, the control unit 201 calculates and sets transfer control parameters P in accordance with which suspension processing by an intermittent operation is performed. An example of calculating the transfer control parameters P in this embodiment will be described with reference to FIG. 5. The control unit 201 calculates a transfer ratio and a transfer size, which are transfer control parameters, from the reference table shown in FIG. 5 based on the information regarding the link speed and the radio field intensity of the wireless information W at the time of being obtained in step S103. The transfer ratio is the same as described in the first embodiment. Regarding the transfer size, the execution speed varies in accordance with the radio wave environment and the link speed. Therefore, in this embodiment, considering that the size of the data that can be transferred per unit time varies, in the case where the radio field intensity is low and the link speed is low, the transfer size is reduced. Conversely, in the case where the radio field intensity is high and the link speed is high, the transfer size is increased. For example, in the case where the link speed is 433 Mbps and the radio field intensity is 3, the transfer size is set to 1 Mbyte and the transfer ratio is set to 50%.

Note that although not illustrated, there are cases where the temperature detected by the temperature detection unit 212 changes depending on the image capturing state of the image capturing unit 205. In order to take this into consideration, the transfer ratio may be reduced in accordance with the image capturing state (moving image capture, live view image capture or the like) of the image capturing unit 205. For example, the control unit 201 determines the extent of heat generation with respect to the image capturing state, and in the case of an image capturing state in which more heat is generated, the transfer ratio may further be reduced.

In step S303, the control unit 201 calculates a suspension time using the transfer control parameters P calculated in step S302 and the time required for data transfer in step S301. Letting the transfer ratio be u %, the suspension time is calculated for a time t2 required for the transfer by suspension time=t2×(100−u)/u. For example, in the case where the transfer ratio is 50% and the time required for transferring data having the transfer size L1 in step S301 is t2, the suspension time is t2×(100−50)/50=t2. Note that the transfer size calculated in step S302 is updated in step S305, which will be described later, and thus the calculated transfer size is taken into consideration in the calculation of a suspension time at the timing of the next processing.

In step S304, the control unit 201 suspends data transfer for the suspension time calculated in step S303. When the suspension time has elapsed, the control unit 201 returns the procedure to step S301 and starts transfer of the next packet. At this time, in the case where the transfer size according to the transfer control parameters P is smaller than the image data size of data remaining to be transferred, the control unit 201 updates the transfer size L1 to the transfer size according to the transfer control parameters P. On the other hand, in the case where the transfer size according to the transfer control parameters P is greater than the image data size of data remaining to be transferred, the update is not performed.

As described above, in this embodiment, the suspension time of data transfer is controlled in accordance with the transfer ratio and the transfer size. At this time, the transfer ratio and transfer size are calculated and set based on the link speed and the radio field intensity of the wireless information W. In particular, in the case where the radio field intensity is high and the communication speed is high, the transfer size is set large (or in the case where the radio field intensity is low and the communication speed is low, the transfer size is set small). With such a configuration, data transfer can be continued in the case where the temperature is higher than or equal to the threshold value, and data can be efficiently transferred while suppressing an increase in temperature. In other words, it is possible to achieve both the temperature control and the transfer efficiency of the communication terminal during wireless communication.

Third Embodiment

Next, a third embodiment will be described. In this embodiment, control of whether or not to perform suspension processing is performed considering whether or not the current mode is a communication mode in which the digital camera 200 can enable suspension processing, in addition to the configuration of the second embodiment. Moreover, in the case where the temperature decreases after suspension processing is started, the transfer control parameters are updated in accordance with the decrease in temperature. The configuration of the digital camera 200 of this embodiment is the same as the first embodiment. Therefore, the same reference numerals are given to the same constituent elements, redundant description is omitted, and the differences will mainly be described.

Figure 4:
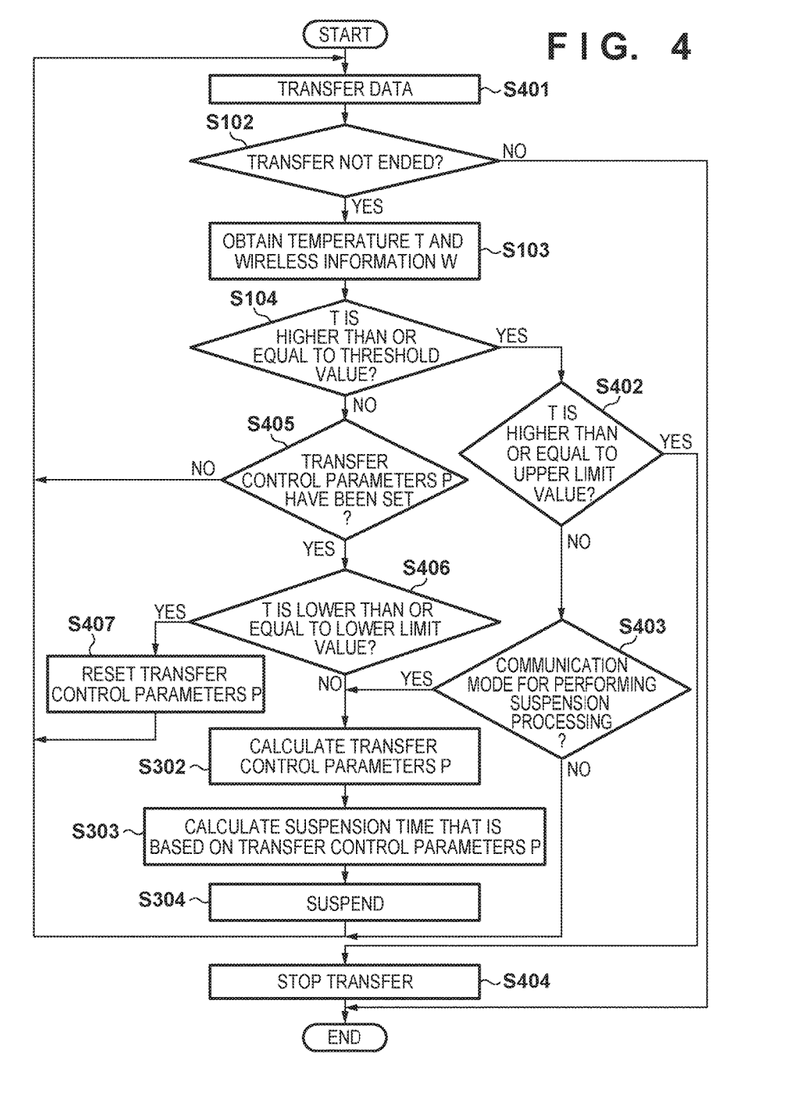
FIG. 4 is a flowchart illustrating a series of operations of transfer control processing according to a third embodiment.

A series of operations of transfer control processing according to the third embodiment will be described below with reference to FIG. 4. In this embodiment, the communication mode is set to an FTP file transfer mode, a mode in which remote control is possible, or the like by the user via the operation unit 209.

In step S401, if a request for transferring image data is given (or the suspension processing in step S304 has ended), the control unit 201 transfers the data via the communication I/F 211. In this embodiment, data transfer is performed in units of a plurality of packets, and the total transfer size constituted by units of a plurality of packets is denoted by L2.

Subsequently, similarly to the first embodiment, the control unit 201 performs the processes of steps S102 to S104, and in the case where all the image data has not been transferred, obtains the temperature T and the wireless information W. In the case where the temperature T is lower than a threshold value, the procedure advances to step S405, and in the case where the temperature T is higher than or equal to the threshold value, the procedure advances to step S402.

In step S402, the control unit 201 compares the temperature T obtained in step S103 to an upper limit value, and determines whether or not the temperature T is higher than or equal to the upper limit, value. In the case where the temperature T is higher than or equal to the upper limit value, the control unit 201 advances the procedure to step S404, and on the other hand, in the case where the temperature T is lower than the upper limit value, advances the procedure to step S403.

In step S403, the control unit 201 determines whether or not the wireless communication mode is a communication mode for performing suspension processing by an intermittent operation. In the case where a predetermined communication mode is set, the control unit 201 determines that the communication mode for performing suspension processing is set and advances the procedure to step S407. On the other hand, in the case where the predetermined communication mode is not set, suspension processing does not need to be performed (or cannot be performed), and thus the procedure returns to step S401 in order to transfer the next data.

Note that whether or not the communication mode for performing suspension processing is set may be determined in accordance with whether the digital camera 200 is operating as a data transfer source (e.g., server) or a data transfer destination (e.g., client). For example, in the case where the digital camera 200 operates as a client (data transfer destination), transfer processing can be performed at any timing determined in the digital camera 200. On the other hand, for example, in the case where the digital camera 200 operates as a server (data transfer source), data requested from a client, which is the communication partner, needs to be immediately returned in response. Accordingly, if a suspension operation is performed when the digital camera 200 operates as a server, an inconvenience such as delay occurs in communication with the client that has been waiting for a response, and an error may occur on the client side. For example, if suspension processing is extended, a timeout may occur on the client side. Therefore, the control unit 201 determines that suspension processing is to be performed in the case where the digital camera 200 operates as a data transfer destination, and suspension processing is not to be performed in the case where the digital camera 200 operates as a data transfer source. For example, in the case of executing data transfer using an FTP client, the digital camera. 200 is operating as a client (transfer destination), and thus the control unit 201 determines that the communication mode for performing suspension processing is set.

After that, the control unit 201 performs the processes regarding steps S302 to S304 similarly to the second embodiment, calculates the transfer control parameters P and a suspension time for performing suspension processing, and suspends the transfer in accordance with the calculated suspension time. When the suspension processing ends, the control unit 201 returns the procedure to step S401, and starts next transfer.

In step S404, the control unit 201 executes transfer stopping processing because the obtained temperature T is higher than or equal to the upper limit value, and protects the constituent elements of the digital camera from the high temperature. When the transfer stopping processing is complete, the control unit 201 ends the series of operations of transfer control processing according to this embodiment.

Next, the processes of steps S405 to S407 in the case where the control unit 201 determines in step S104 that the temperature T is lower than the threshold value will be described. In step S405, the control unit 201 determines whether or not transfer processing using the transfer control parameters P has already been executed. For example, in the case where the transfer control parameters P have already been set, the control unit 201 determines that transfer processing using the transfer control parameters P is already being executed, and advances the procedure to step S406. On the other hand, in the case where transfer control parameters are not set, it is determined that transfer processing using the transfer control parameters P is not being executed, and the procedure returns to step S401 in order to start next transfer.

In step S406, the control unit 201 compares the temperature T obtained in step S103 to a lower limit value of temperature, and determines whether or not the temperature T is lower than or equal to the lower limit value of temperature. In the case where the temperature T is lower than or equal to the lower limit value of temperature, the procedure advances to step S407, and in the case where the temperature T is higher than the lower limit value of temperature, the procedure advances to step S302 in order to calculate the transfer control parameters P again. Specifically, if the temperature T already decreased below a temperature threshold value during transfer processing using the transfer control parameters P, transfer control parameters that are appropriate for this situation are set again. With such a configuration, communication that is more efficient than at the time of a high temperature can be performed while performing suspension processing. Note that as is clear from the above description, the lower limit value of temperature is a value lower than the temperature threshold value.

In step S407, the control unit 201 resets the transfer control parameters P (disables the set values), and updates the transfer size L2 to a transfer size of a predetermined initial value. Accordingly, if the temperature T has decreased to the lower limit temperature or lower, it is no longer necessary to perform transfer control while performing suspension processing. Therefore, the control unit 201 resets the transfer control parameters P to the initial values, and performs control so as to perform transfer processing that does not involve suspension processing. After that, the control unit 201 transitions to step S401, and starts next transfer.

As described above, in this embodiment, the control unit 201 determines whether or not the digital camera 200 is operating in a communication mode for performing suspension processing, and for example, only in the case of a predetermined communication mode such as an FTP client, the suspension processing is performed. With such a configuration, it is possible to reduce an inconvenience between the server and the client that can occur due to suspension processing when responsiveness in a case such as the case where the digital camera 200 operates as a server is demanded, for example. In the case where the temperature decreases after suspension processing is started, the control unit 201 updates or resets the transfer control parameters in accordance with the decrease in temperature. With such a configuration, the communication state can be changed more dynamically in accordance with the temperature, and communication can be performed more efficiently. Accordingly, it is possible to achieve both the temperature control and the transfer efficiency of the communication terminal during wireless communication.

Fourth Embodiment

Furthermore, a fourth embodiment will be described. In the fourth embodiment, a communication apparatus removable from the digital camera 200 and the digital camera 200 cooperate with each other in order to perform transfer control processing. Note that because the digital camera 200 of this embodiment has the same configuration as the first to third embodiments, the same reference numerals are given to the same constituent elements, redundant description is omitted, and the differences will mainly be described. Note that the removable communication apparatus (communication accessory) will be described below as being mounted to the digital camera.

Figure 6:
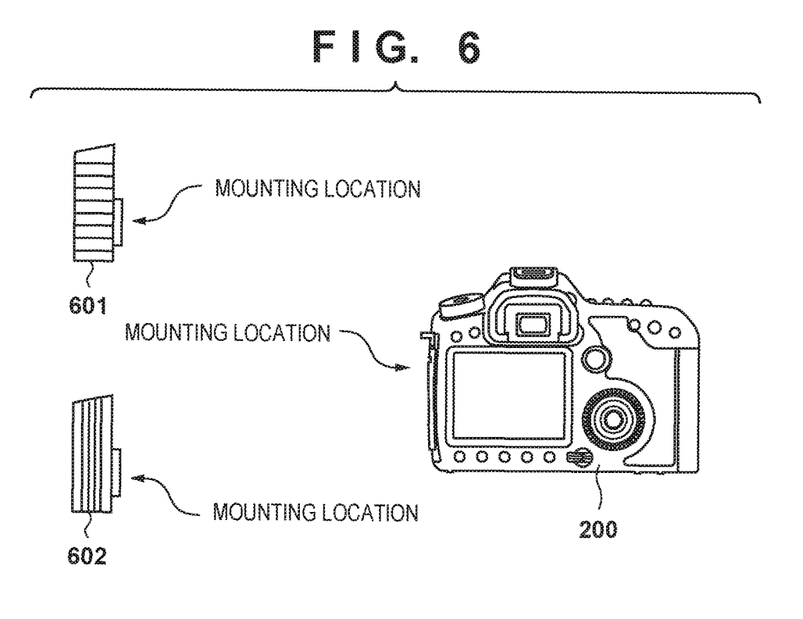
FIG. 6 is a diagram illustrating communication accessories as examples of a removable communication apparatus according to the fourth embodiment.

First, the configuration of the removable communication apparatus will be described with reference to FIG. 6. A communication accessory 601 is a communication device provided with a temperature detection unit capable of detecting the temperature, and is mounted to the digital camera 200 at a predetermined mounting location. A communication accessory 602 is a communication device that is not provided with a temperature detection unit, and is mounted to the digital camera 200 at a predetermined mounting location similarly to the communication accessory 601.

Figure 7A:
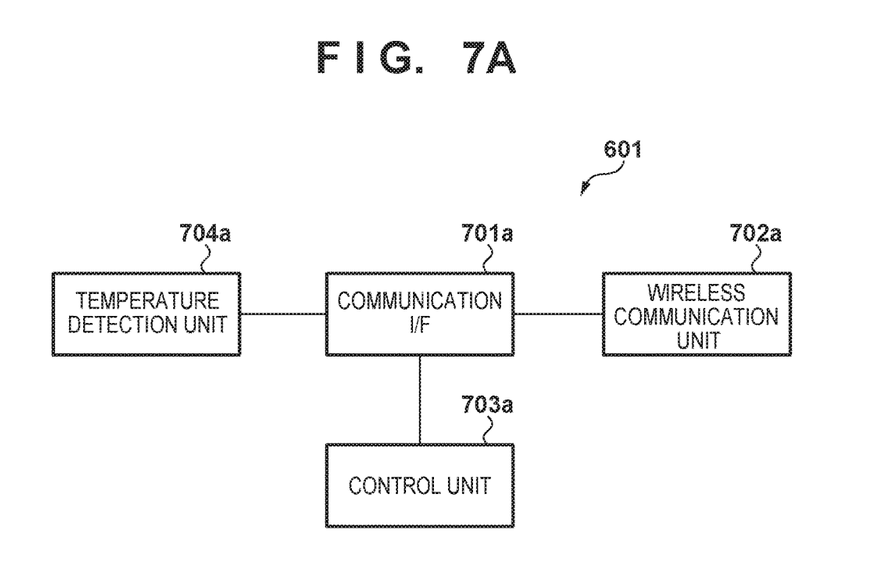
FIGS. 7A and 7B are block diagrams showing an example of a function configuration of a communication accessory according to the fourth embodiment.
Figure 7B:
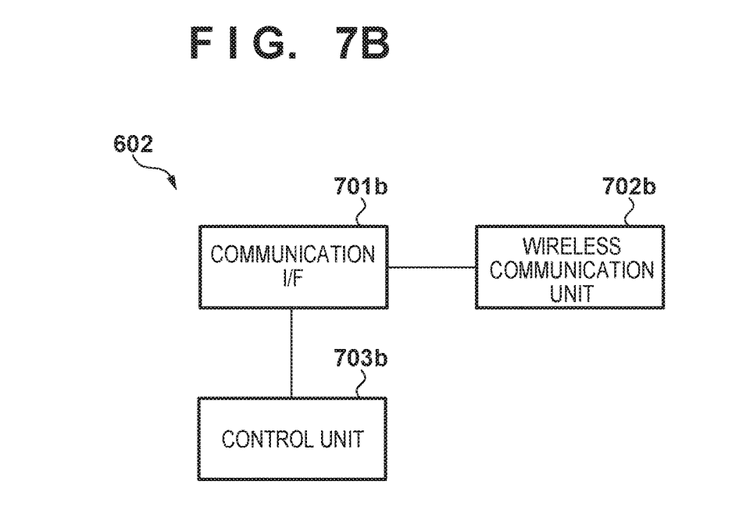

Next, FIGS. 7A and 7B are block diagrams respectively showing examples of the function configurations of the communication accessory 601 and the communication accessory 602 as examples of the removable communication apparatus of this embodiment. A communication I/F (interface) 701a connects to the communication I/F 211 of the digital camera 200 and performs communication. A wireless communication unit 702a realizes communication conforming to a wireless system such as a wireless LAN, for example. A control unit 703a includes a CPU or an MPU, a RAM, a ROM and the like, for example, and performs overall control of the communication accessory 601 by loading a program stored in the ROM to a work area of the RAM and executing the program. A temperature detection unit 704a includes a temperature sensor, for example, and outputs the temperature obtained from the temperature sensor. The control unit 703a transmits/receives the temperature output by the temperature detection unit 704a and transfer data to/from the control unit 201.

Similarly to the communication I/F 701a, a communication I/F (interface) 701b of the communication accessory 602 connects to the communication I/F 211 of the digital camera 200 and performs communication. Similarly to the wireless communication unit 702a, a wireless communication unit 702b realizes wireless communication. Similarly to the control unit 703a, a control unit 703b includes a CPU or an MPU, for example, and performs overall control of the communication accessory 602.

Figure 8:
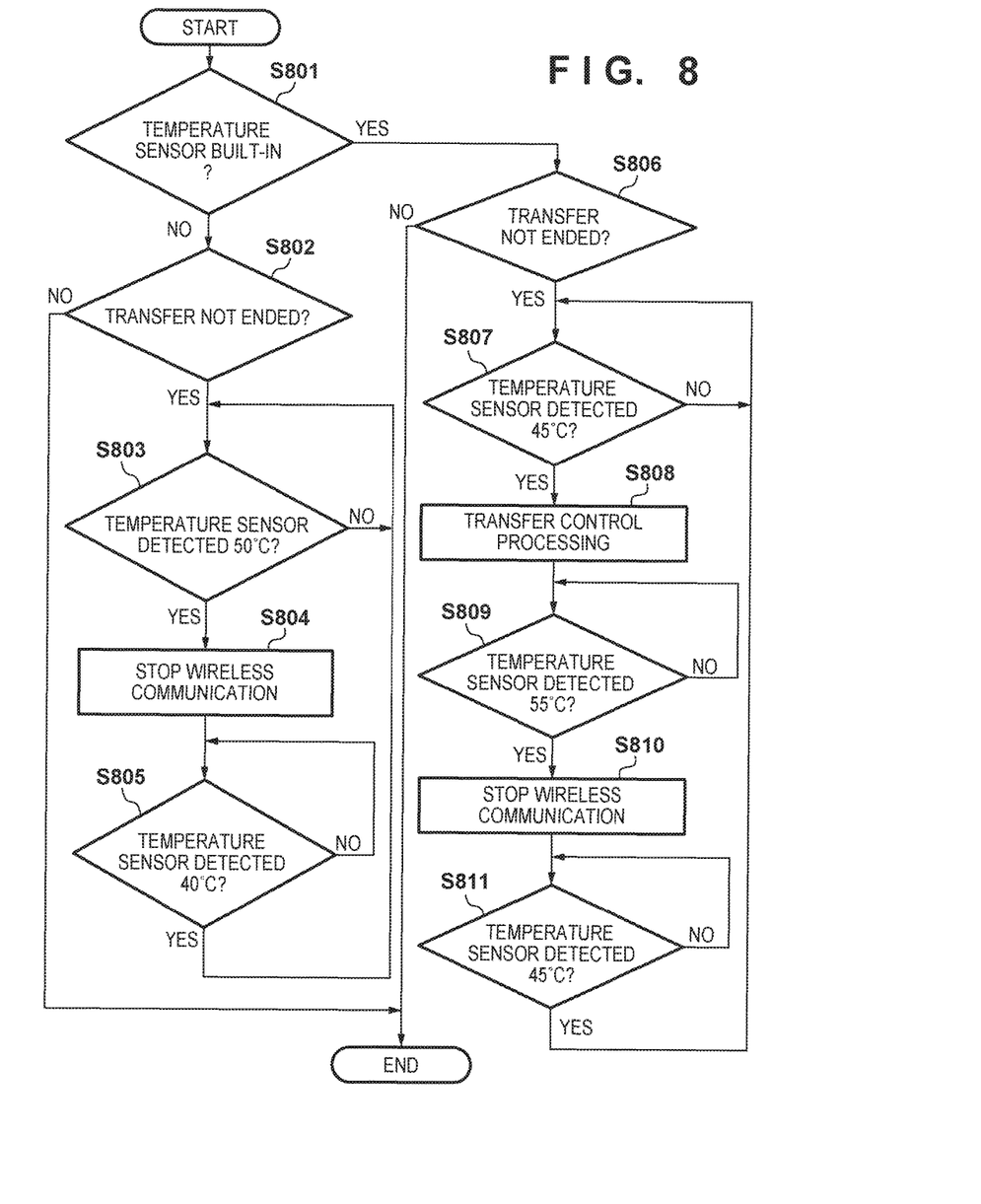
FIG. 8 is a flowchart showing a series of operations of transfer control processing in the case where a communication accessory is mounted to a communication apparatus.

Next, a series of operations related to transfer control processing will be described with reference to FIG. 8. Note that this series of processing is started when either the communication I/F 701a of the communication accessory 601 or the communication. I/F 701b of the communication accessory 602 is connected to the communication I/F 211 of the digital camera 200.

In step S801, the control unit 201 of the digital camera 200 determines whether or not the connected communication accessory is provided with a temperature sensor. For example, the control unit 201 obtains the configuration information of the communication accessory via a communication I/F, and determines the presence or absence of a temperature sensor. In the case where it is determined that the connected communication accessory is provided with a temperature sensor, the control unit 201 advances the procedure to step S806, and in the case where it is determined that the connected communication accessory is not provided with a temperature sensor, advances the procedure to step S802.

In step S802, the control unit 201 determines whether or not transfer processing has ended. In the case where transfer processing for all the data has not ended, the control unit 201 advances the procedure to step S803. On the other hand, in the case where the transfer processing for all the data has ended, this series of processing is ended.

In step S803, the control unit 201 performs, via the wireless communication unit 702b, communication in which an intermittent operation is not performed (also referred to as normal communication), and determines whether or not the temperature T obtained from the temperature detection unit 212 is higher than or equal to a temperature threshold value (for example, the temperature threshold value is set to 50° C.). In the case where the obtained temperature T is lower than 50° C., the control unit 201 continues normal communication in which an intermittent operation is not performed. On the other hand, in the case where it is determined that the temperature T is higher than or equal to 50° C., the control unit 201 advances the procedure to step S804.

In step S804, the control unit 201 stops communication performed via the wireless communication unit 702b, and sets a stopped wireless communication state.

In step S805, the control unit 201 obtains the temperature T from the temperature detection unit 212, and determines whether or not the temperature T has decreased below a temperature indicating the cooling extent (for example, the temperature indicating the cooling extent is set to 40° C.). In the case where the temperature T is higher than 40° C., the control unit 201 returns the procedure to step S805, and continues the stopped wireless communication state until a temperature T lower than or equal to 40° C. is detected. On the other hand, in the case where a temperature T lower than or equal to 40° C. is detected, the control unit 201 switches wireless communication from the stopped state to normal communication, and returns the procedure to step S802.

On the other hand, in the case where it is determined in step S801 that the communication accessory is provided with a temperature sensor, the control unit 201 determines in step S806 whether or not transfer processing has ended. In the case where the transfer processing for all the data has not ended, the control unit 201 advances the procedure to step S807. On the other hand, in the case where the transfer processing for all the data has ended, this series of processing is ended.

In step S807, the control unit 201 performs normal communication via the wireless communication unit 702a, and determines whether or not the temperature T obtained from the temperature detection unit 704a is higher than or equal to a temperature threshold value (for example, this temperature threshold value is set to 45° C.). In the case where the obtained temperature T is lower than 45° C., the control unit 201 returns the procedure to step S806, and continues the normal communication. On the other hand, in the case where the temperature T higher than or equal to 45° C., the procedure advances to step S808.

In step S808, the control unit 201 starts the transfer control processing described above in the first to third embodiments. In step S809, the control unit 201 determines whether or not the temperature T obtained from the temperature detection unit 704a has reached a temperature threshold value (for example, the temperature threshold value here is set to 55° C.). In the case where the obtained temperature T is lower than 55° C., the procedure returns to step S809 in order to continue wireless transfer control. On the other hand, in the case where the temperature T is higher than or equal to 55° C., the procedure advances to step S810.

In step S810, the control unit 201 stops transfer control, and sets a stopped wireless communication state. Next, in step S811, the temperature T is obtained from the temperature detection unit 704a, and whether or not the temperature T has decreased below a temperature indicating the cooling extent (for example, the temperature indicating the cooling extent is set to 40° C.) is determined. In the case where the temperature T is higher than 40° C., the control unit 201 returns the procedure to step S811, and continues the stopped wireless communication state until a temperature T lower than or equal to 40° C. is detected. On the other hand, in the case where a temperature T less than or equal to 40°

C. is detected, the control unit 201 switches wireless communication from the stopped state to normal communication, and returns the procedure to step S806. As described above, in the case where it is determined in step S806 that the transfer ended, this series of operations is ended.

Note that in the example described with reference to FIG. 8, the series of processing is started when the communication I/F 701a or the communication I/F 701b is connected to the communication I/F 211. However, the processing may be started in other cases. For example, the processing may be started at a predetermined timing when the image capturing unit 205 of the digital camera 200 is operating (e.g., during still image shooting, continuous shooting, live view display, still image shooting during live view, moving image shooting). Moreover, the series of processing may be started at a predetermined timing under a condition in which heat generation easily occurs, such as when an access to the storage medium 207 is occurring and when the display unit 210 is operating.

As described above, in this embodiment, in the case where a communication accessory is connected, the source from which the temperature is obtained is controlled in accordance with whether or not the communication accessory is provided with a temperature detection unit, and transfer control is performed based on the obtained temperature. Specifically, the digital camera 200 obtains the temperature from either the digital camera 200 or the communication accessory, and control is performed so as to perform communication in which an intermittent operation is performed, perform normal communication in which an intermittent operation is not performed, or stop communication. With such a configuration, even in the case of using a communication accessory, communication that involves an intermittent operation can be easily and accurately performed. Regardless of whether or not the communication accessory is provided with a temperature detection unit, it is possible to realize communication that involves an intermittent operation.

Fifth Embodiment

Next, a fifth embodiment will be described. In the fifth embodiment, unlike the fourth embodiment, consideration is given to temperature increase of communication accessories that perform different types of wireless communication, the difference in the temperature measurement depending on the mounting position and the like. The configurations of the communication accessories 601 and 602 and the digital camera 200 according to this embodiment are the same as those in the fourth embodiment. Therefore, the same reference numerals are given to the same constituent elements, redundant description is omitted, and the differences will mainly be described.

In this embodiment, the communication accessory 601 or 602 is a communication apparatus conforming to a communication system such as LTE (registered trademark) or Bluetooth (registered trademark), for example, and is connected to the digital camera 200 via the communication I/F 211. The communication I/F 211 of the digital camera 200 is constituted to include a built-in wireless LAN module.

Figure 9A:
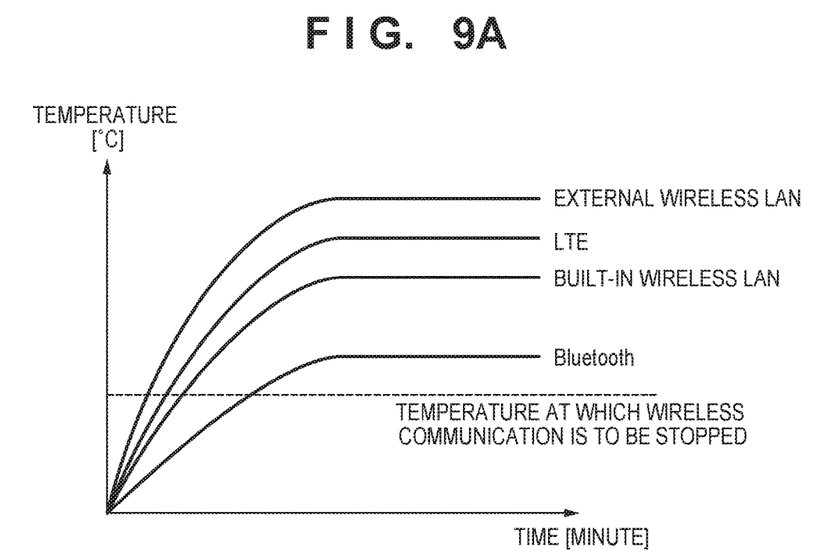
FIGS. 9A and 9B are respectively a graph and a table illustrating threshold values of a temperature detection unit in the case of using a plurality of types of external communication units or built-in communication units according to a fifth embodiment.

As schematically shown in FIG. 9A, the extent of temperature increase varies in accordance with the wireless type, transmission output and the like, and thus the operation time is different in the case of using each type of wireless communication. For example, in the case of using an external wireless LAN, the temperature at which wireless communication is to be stopped is reached the earliest and thus the operation time is shortened, and on the other hand, in the case of using Bluetooth (registered trademark), the temperature at which wireless communication is to be stopped is reached the latest, and thus the operation time is extended.

When performing transfer control processing, in the case where a wireless accessory is provided with a temperature detection unit, or in the case where the digital camera 200 is provided with a built-wireless LAN module near the temperature detection unit 212, the temperature during communication can be accurately detected. Therefore, a certain value can be used as a temperature at which wireless communication is to be stopped.

However, there are cases where a communication apparatus that is not provided with a temperature detection unit such as the communication accessory 602 is connected, and temperature detection is performed using the temperature detection unit 212 of the digital camera 200. Moreover, there are cases where the temperature detection unit 212 is not mounted near a built-in wireless LAN module depending on the configuration of the digital camera 200. In such a case, depending on the mounting positions of the wireless accessory and the built-in wireless LAN module, the correlation with the temperature detection unit 212 changes. Therefore, the operation time cannot be indiscriminately set in accordance with the wireless type, transmission output and the like. For example, in the case where the temperature at which wireless communication is to be stopped is set to 60° C., if a temperature difference arises between the temperature detected by the temperature detection unit 212 and the communication accessory, there are cases where wireless communication is stopped before reaching the temperature at which wireless communication is to be stopped, and thus the communicable time is shortened. On the contrary, there is a possibility that the temperature at which wireless communication is to be stopped is exceeded, causing a malfunction or the like.

Figure 9B:
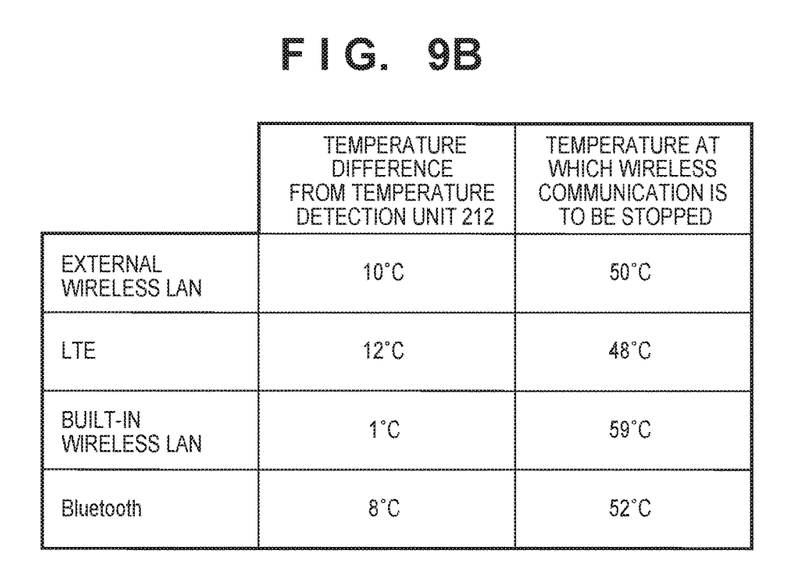

Therefore, in this embodiment, as shown in FIG. 9B, the temperature difference between the temperature detection unit 212 and the communication accessory or the built-in wireless LAN module is determined in advance by performing experiments considering the mounting position and the like, and is held as data indicating the temperature difference. When performing determination regarding the obtained temperature T, the control unit 201 references the data indicating the temperature difference, and corrects the temperature at which wireless communication is to be stopped (or the threshold values). With such a configuration, more accurate determination regarding the detected temperature is possible. In other words, in the digital camera 200, determination regarding the detected temperature for a plurality of communication systems can be performed accurately.

Note that in the fourth embodiment, an example was described in which transfer control processing is not performed in the case where a temperature sensor is not incorporated in a communication accessory. However, as described in this embodiment, based on the assumption that the temperature detected by the temperature detection unit 212 is corrected, even in the case where a temperature sensor is not incorporated in the communication accessory, the processes of steps S806 to S811 that include transfer control processing may be performed. With such a configuration, even in the case of connecting a communication accessory that does not include a temperature sensor, transfer control processing can be realized.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-168140, filed Aug. 27, 2015, which is hereby incorporated by reference herein in its entirety.

What is claimed is:

1. A communication apparatus comprising:
a first detection unit configured to detect a temperature of the communication apparatus,
wherein a communication accessory having a communication unit for communicating with an external apparatus can be mounted to the communication apparatus;
a determination unit configured to, in a case where the communication accessory is mounted to the communication apparatus, determine whether the mounted communication accessory comprises a second detection unit for detecting a temperature of the communication accessory; and
a control unit configured to, in a case where the determination unit determines that the communication accessory comprises the second detection unit, when performing data transfer to the external apparatus via the communication unit, cause the second detection unit to detect a temperature of the communication accessory, perform, in a case where the detected temperature is lower than a first value, a first communication operation performed without suspending the data transfer, and perform, in a case where the detected temperature is higher than or equal to the first value, a second communication operation performed while involving suspending the data transfer,
wherein the control unit is configured to, in a case where the determination unit determines that the communication accessory does not comprise the second detection unit, when performing data transfer to the external apparatus via the communication unit, cause the first detection unit to detect a temperature of the communication apparatus, and cause, in a case where the detected temperature is higher than or equal to a second value, the communication unit to suspend the data transfer.

2. The communication apparatus according to claim 1, wherein the control unit compares, in the case where the determination unit determines that the communication accessory comprises the second detection unit, the detected temperature by the second detection unit and the first value every time the communication unit communicates a predetermined amount of data, and based on a result of the comparison, performs the first communication operation or the second communication operation.

3. The communication apparatus according to claim 1, wherein the control unit sets, based on a communication state of the communication unit, a suspension time of the data transfer when performing the second communication operation.

4. The communication apparatus according to claim 3, wherein the weaker the radio field intensity when performing the first communication operation is, the longer the suspension time is set by the control unit, and the lower the communication speed set when performing the first communication operation is, the smaller the amount of data to be transmitted per unit time is set by the control unit.

5. The communication apparatus according to claim 1, wherein the control unit performs the second communication operation in a case where the communication apparatus operates in a predetermined communication mode in which the second communication operation can be operated.

6. The communication apparatus according to claim 5, wherein the predetermined communication mode includes a communication mode in which the communication apparatus operates as a client for a data transfer, and the control unit performs the second communication operation in a case of operation in the communication mode in which the communication apparatus operates as a client for a data transfer, and does not perform the second communication operation in a case of a communication mode in which the communication apparatus operates as a server for the data transfer.

7. The communication apparatus according to claim 3, wherein the weaker the radio field intensity when performing the first communication operation is, the longer the suspension time is set by the control unit.

8. The communication apparatus according to claim 1, wherein the communication apparatus includes a digital camera.

9. The communication apparatus according to claim 1, wherein the communication apparatus includes an on-vehicle device.

10. The communication apparatus according to claim 1, wherein the communication apparatus includes a medical device.

11. The communication apparatus according to claim 1, wherein the first value is lower than the second value.

12. A control method of a communication apparatus having a first detection unit configured to detect a temperature of the communication apparatus, wherein a communication accessory having a communication unit for communicating with an external apparatus can be mounted to the communication apparatus, the method comprising:
determining, in a case where the communication accessory is mounted to the communication apparatus, whether the mounted communication accessory comprises a second detection unit for detecting a temperature of the communication accessory;

performing control so as to cause, in a case of determining that the communication accessory comprises the second detection unit, when performing data transfer to the external apparatus via the communication unit, the second detection unit to detect a temperature of the communication accessory, perform, in a case where the detected temperature is lower than a first value, a first communication operation performed without suspending the data transfer, and perform, in a case where the detected temperature is higher than or equal to the first value, a second communication operation performed involving suspending the data transfer, wherein the control unit is configured to, in a case of determining that the communication accessory does not comprise the second detection unit, when performing data transfer to the external apparatus via the communication unit, cause the first detection unit to detect a temperature of the communication apparatus, and cause, in a case where the detected temperature is higher than or equal to a second value, the communication unit to suspend the data transfer.

13. A non-transitory computer-readable storage medium storing a program for causing a computer to function as each unit of a communication apparatus comprising:

a first detection unit configured to detect a temperature of the communication apparatus, wherein a communication accessory having a communication unit for communicating with an external apparatus can be mounted to the communication apparatus;

a determination unit configured to, in a case where the communication accessory is mounted to the communication apparatus, determine whether the mounted communication accessory comprises a second detection unit for detecting a temperature of the communication accessory; and a control unit configured to, in a case where the determination unit determines that the communication accessory comprises the second detection unit, when performing data transfer to the external apparatus via the communication unit, cause the second detection unit to detect a temperature of the communication accessory, perform, in a case where the detected temperature is lower than a first value, a first communication operation performed without suspending the data transfer, and perform, in a case where the detected temperature is higher than or equal to the first value, a second communication operation performed involving suspending the data transfer, wherein the control unit is configured to, in a case where the determination unit determines that the communication accessory does not comprise the second detection unit, when performing data transfer to the external apparatus via the communication unit, cause the first detection unit to detect a temperature of the communication apparatus, and cause, in a case where the detected temperature is higher than or equal to a second value, the communication unit to suspend the data transfer.

* * * * *